(12) United States Patent
Santos

(10) Patent No.: US 11,794,639 B1
(45) Date of Patent: Oct. 24, 2023

(54) LIGHTED GUIDEPOST FOR A BOAT TRAILER

(71) Applicant: Angel Santos, Hollywood, FL (US)

(72) Inventor: Angel Santos, Hollywood, FL (US)

( * ) Notice: Subject to any disclaimer, the term of this patent is extended or adjusted under 35 U.S.C. 154(b) by 0 days.

(21) Appl. No.: 18/075,529

(22) Filed: Dec. 6, 2022

(51) Int. Cl.
| | | |
|---|---|---|
| B60Q 1/30 | (2006.01) | |
| F21S 43/14 | (2018.01) | |
| F21S 43/20 | (2018.01) | |
| F21W 107/10 | (2018.01) | |
| F21W 103/10 | (2018.01) | |
| F21Y 115/10 | (2016.01) | |
| F21V 21/10 | (2006.01) | |
| F21S 45/50 | (2018.01) | |

(52) U.S. Cl.
CPC .............. *B60Q 1/305* (2013.01); *F21S 43/14* (2018.01); *F21S 43/26* (2018.01); *F21S 45/50* (2018.01); *F21V 21/10* (2013.01); *F21W 2103/10* (2018.01); *F21W 2107/10* (2018.01); *F21Y 2115/10* (2016.08)

(58) Field of Classification Search
CPC ...................................................... B60Q 1/305
See application file for complete search history.

(56) References Cited

U.S. PATENT DOCUMENTS

| | | | | |
|---|---|---|---|---|
| 3,887,093 | A * | 6/1975 | Howell | B60P 3/1075 414/532 |
| D351,115 | S | 10/1994 | Valdez | |
| 7,001,052 | B2 | 2/2006 | Cullinan | |
| 7,017,933 | B2 | 3/2006 | Mickley | |
| 7,628,519 | B2 | 12/2009 | Purdy | |
| 9,896,021 | B2 | 2/2018 | Speropoulos | |
| 10,889,239 | B2 * | 1/2021 | Washington | B60Q 1/0483 |
| D936,523 | S | 11/2021 | Reynolds | |
| 11,414,003 | B1 * | 8/2022 | Reynolds | B60Q 1/2657 |
| 2005/0263982 | A1 * | 12/2005 | Mickley | B60P 3/1075 280/414.1 |
| 2016/0090028 | A1 * | 3/2016 | Krejci | B60Q 1/2657 362/485 |
| 2016/0243978 | A1 * | 8/2016 | Speropoulos | B60Q 1/0035 |
| 2022/0297595 | A1 * | 9/2022 | Ratliff, Sr. | F21S 4/28 |

FOREIGN PATENT DOCUMENTS

WO  2005023587  3/2005

* cited by examiner

*Primary Examiner* — Eric T Eide
(74) *Attorney, Agent, or Firm* — Kyle A. Fletcher, Esq.

(57) ABSTRACT

The lighted guidepost for a boat trailer may comprise a guidepost and a light assembly. The guidepost may be coupled to a boat trailer such that the guidepost extends vertically above a side of the rear of the boat trailer. The guidepost may be configured to be visible even when the rear of the boat trailer is submerged in water. The light assembly may be coupled to the top of the guidepost. The light assembly may be illuminated to increase the visibility of the guidepost. A pair of lighted guideposts may be coupled to opposing sides of the rear of the boat trailer such that the light assemblies may designate the rear of the boat trailer.

16 Claims, 4 Drawing Sheets

LIGHTED GUIDEPOST FOR A BOAT TRAILER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of boating accessories, more specifically, a lighted guidepost for a boat trailer.

SUMMARY OF INVENTION

The lighted guidepost for a boat trailer may comprise a guidepost and a light assembly. The guidepost may be coupled to a boat trailer such that the guidepost extends vertically above a side of the rear of the boat trailer. The guidepost may be configured to be visible even when the rear of the boat trailer is submerged in water. The light assembly may be coupled to the top of the guidepost. The light assembly may be illuminated to increase the visibility of the guidepost. A pair of lighted guideposts may be coupled to opposing sides of the rear of the boat trailer such that the light assemblies may designate the rear of the boat trailer. The light assemblies are able to rotate 90 degrees from an outward orientation to an inward orientation, as needed.

An object of the invention is to provide a guidepost that may be coupled to the side of the rear of a boat trailer.

Another object of the invention is to provide a light assembly that may be coupled to the top of the guidepost and may be illuminated to increase visibility of the top of the guidepost.

A further object of the invention is to couple the light assembly to the guidepost such that the light assembly extends away from the guidepost at a right angle.

Yet another object of the invention is to use the lighted guideposts in pairs with a first lighted guidepost coupled to the left side of the trailer and a second lighted guidepost coupled to the right side of the trailer.

These together with additional objects, features and advantages of the lighted guidepost for a boat trailer will be readily apparent to those of ordinary skill in the art upon reading the following detailed description of the presently preferred, but nonetheless illustrative, embodiments when taken in conjunction with the accompanying drawings.

In this respect, before explaining the current embodiments of the lighted guidepost for a boat trailer in detail, it is to be understood that the lighted guidepost for a boat trailer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lighted guidepost for a boat trailer.

It is therefore important that the claims be regarded as including such equivalent construction insofar as they do not depart from the spirit and scope of the lighted guidepost for a boat trailer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
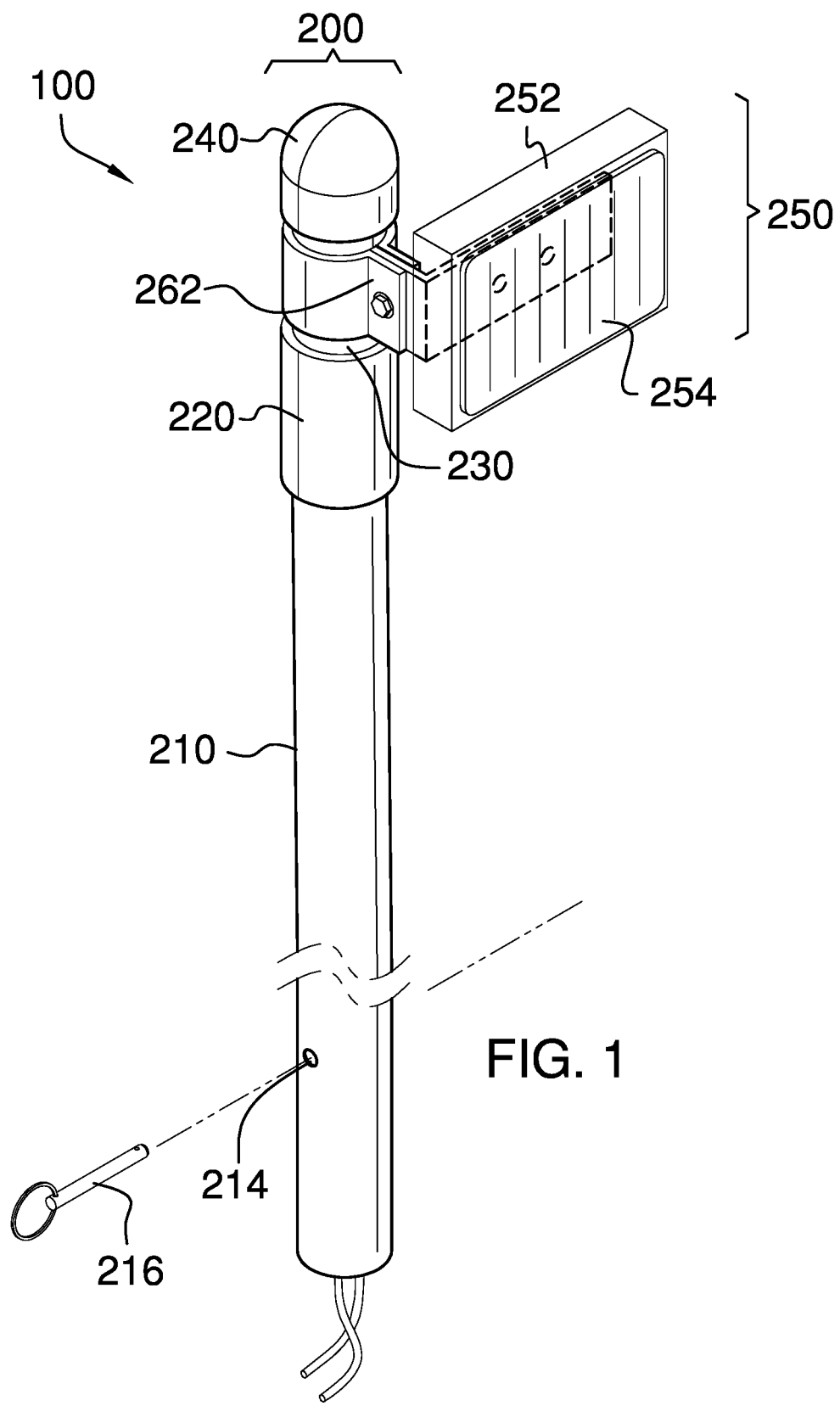
FIG. 1 is an isometric view of an embodiment of the disclosure.
Figure 2:
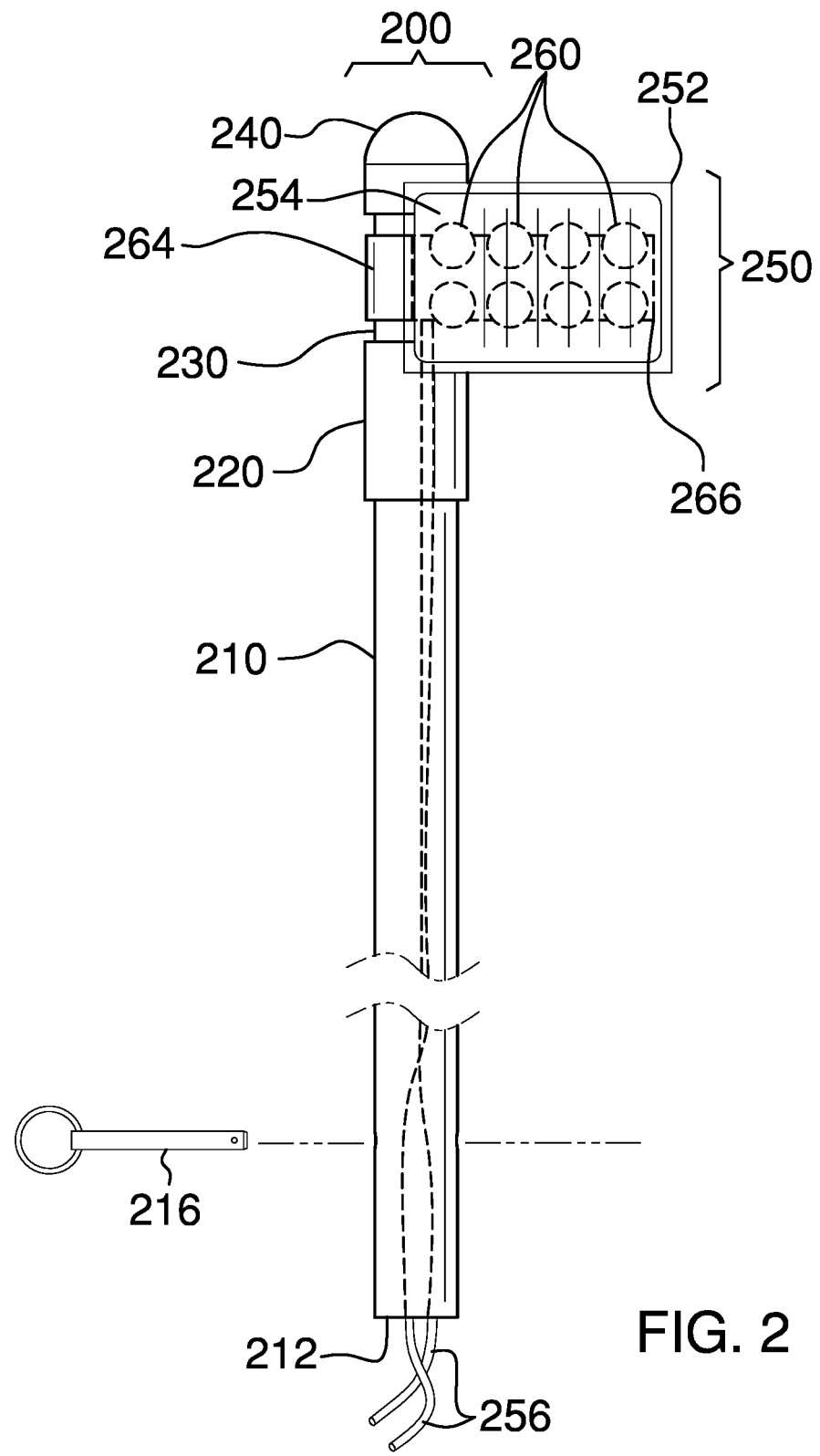
FIG. 2 is a front view of an embodiment of the disclosure.
Figure 3:
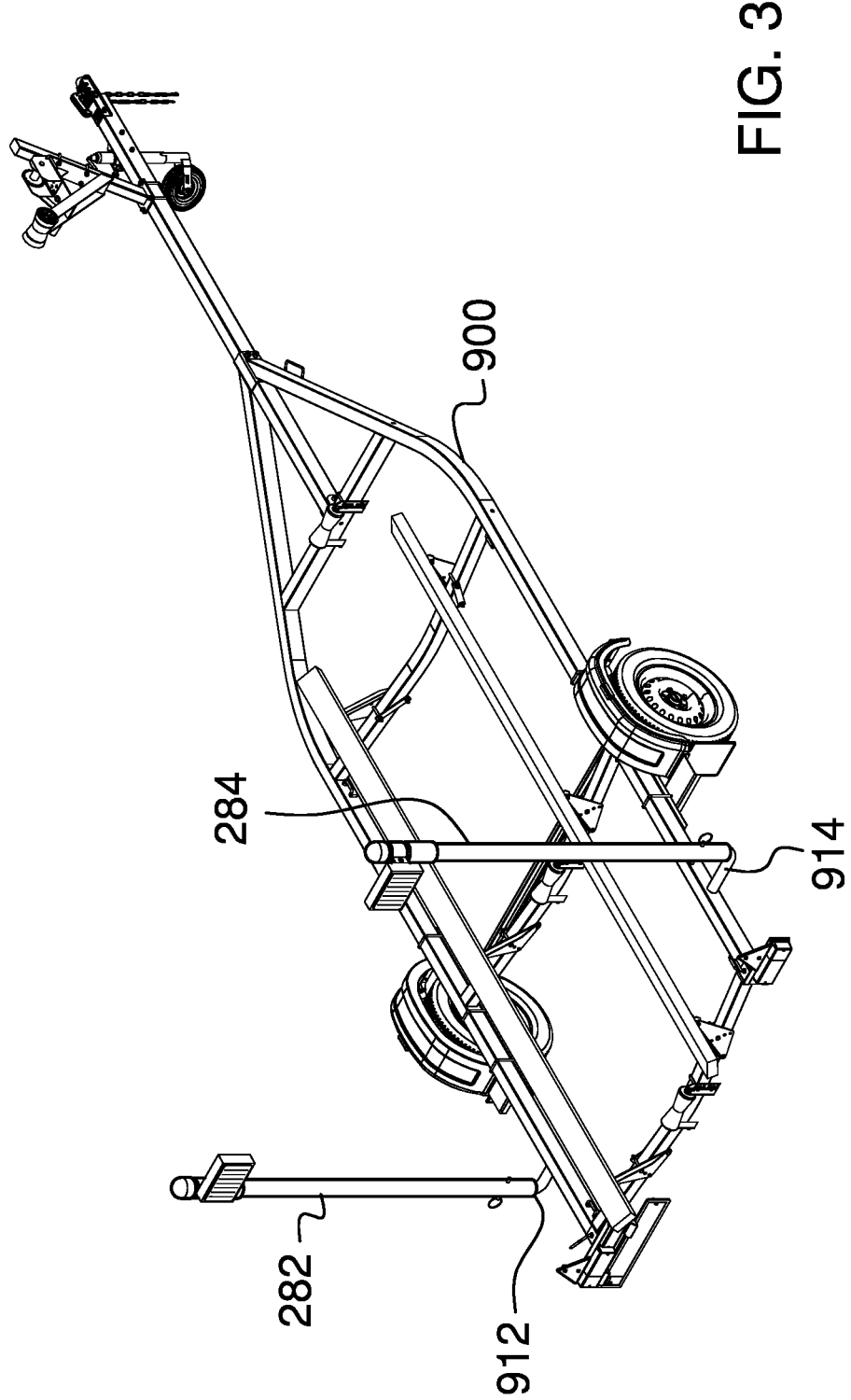
FIG. 3 is an in-use view of an embodiment of the disclosure.
Figure 4:
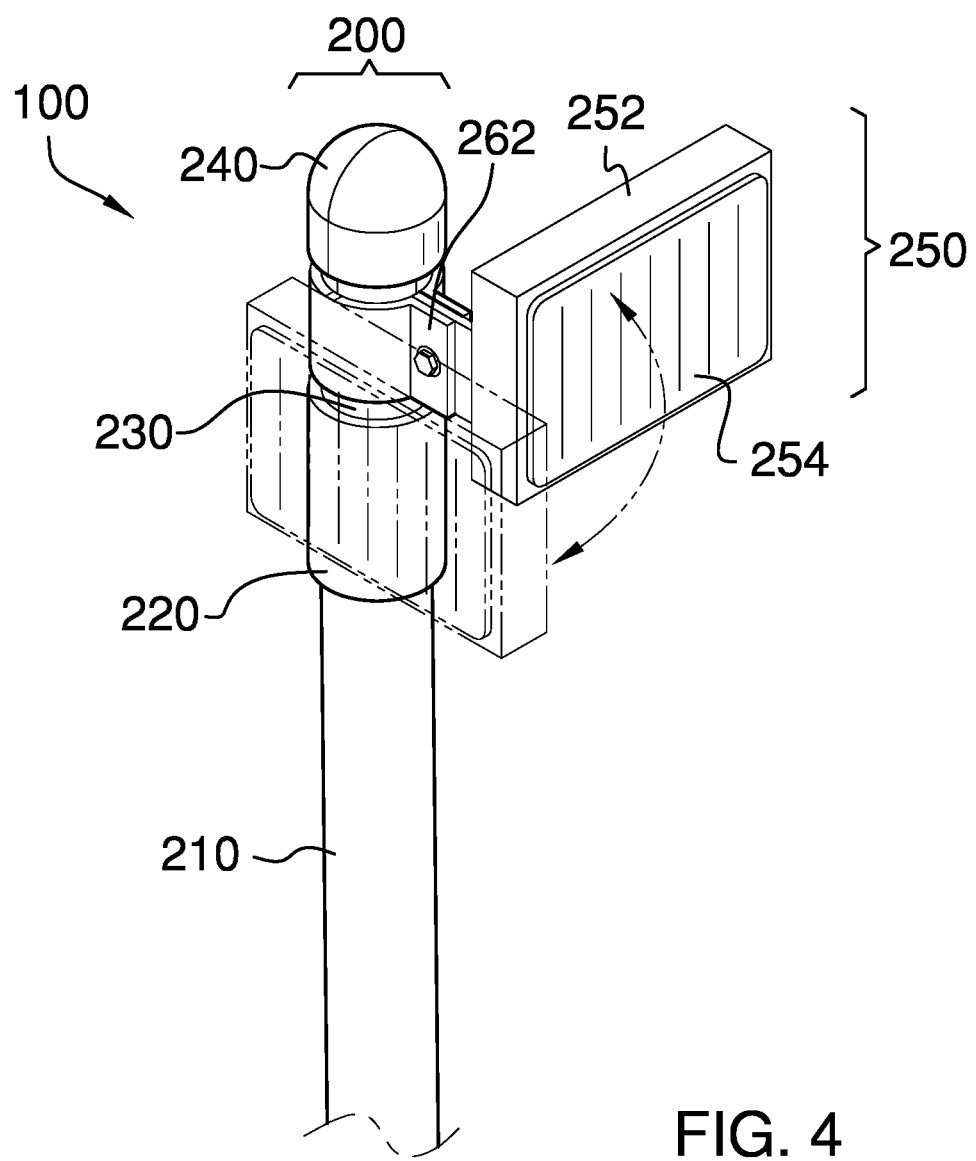
FIG. 4 is another view of an embodiment of the disclosure.

Detailed reference will now be made to a first potential embodiment of the disclosure, which is illustrated in FIGS. 1 through 4.

The lighted guidepost for a boat trailer 100 (hereinafter invention) comprises a guidepost 200 and a light assembly 250. The guidepost 200 may be coupled to a boat trailer 900 such that the guidepost 200 extends vertically above a side of the rear of the boat trailer 900. The guidepost 200 may be configured to be visible even when the rear of the boat trailer 900 is submerged in water. The light assembly 250 may be coupled to the top of the guidepost 200. The light assembly 250 may be illuminated to increase the visibility of the guidepost 200. A pair of lighted guideposts may be coupled to opposing sides of the rear of the boat trailer 900 such that the light assemblies 250 may designate the rear of the boat trailer 900.

The guidepost 200 may comprise a support leg 210, a stopper coupling 220, an attachment post 230, and a cap 240.

The guidepost 200 may comprise a linear coupling of the support leg 210, the stopper coupling 220, the attachment post 230, and the cap 240 in that order. The guidepost 200 may be upright when installed on the boat trailer 900. As non-limiting examples, the guidepost 200 may be vertically-oriented or may lean at an oblique angle away from the lateral centerline of the boat trailer 900.

The support leg 210 may be a hollow cylindrical tube. The top of the support leg 210 may be coupled to the stopper coupling 220. The bottom of the support leg 210 may comprise a bottom aperture 212 through which wiring 256 may emerge from the guidepost 200. In a preferred embodiment, the support leg 210 may comprise at least ¾ of the height of the guidepost 200. The bottom half of the support leg 210 may comprise a pin aperture 214 that may pass laterally through the support leg 210. The pin aperture 214 may be configured to retain the guidepost 200 on a guide post mount of the boat trailer 900. Specifically, the guidepost 200 may be retained on the guide post mount by a push pin 216 or other mounting hardware that may pass through the pin aperture 214 of the support leg 210 and through a matching aperture on the guide post mount.

The stopper coupling 220 may be a hollow cylindrical tube comprising a larger outside diameter than the support leg 210. The stopper coupling 220 may couple the support leg 210 to the attachment post 230. The stopper coupling 220 may also stop the light assembly 250 from sliding down the guidepost 200 in the event that a light mount 262 loosens.

The attachment post 230 may be a hollow cylindrical tube comprising the same outside diameter as the support leg 210. The light assembly 250 may couple to the attachment post 230 to elevate the light assembly 250.

The cap 240 may couple to the top of the attachment post 230 and may cover the top of the guidepost 200.

The light assembly 250 may comprise a light housing 252, a lens 254, a plurality of lights 260, and the light mount 262. The light assembly 250 may be coupled to the attachment post 230 of the guidepost 200 via the light mount 262 such that the light assembly 250 is elevated above the boat trailer 900. The light assembly 250 may be illuminated to increase visibility of the guidepost 200.

The light housing 252 may be an enclosure for the plurality of lights 260. The lens 254 may cover the front of the light housing 252. The light housing 252 and the lens 254 may form a weatherproof covering for the plurality of lights 260. The lens 254 may be a non-opaque covering such that light from the plurality of lights 260 may be visible outside of the light housing 252.

The plurality of lights 260 may be a plurality of electrical devices that generate visible light when energized. In a preferred embodiment, the plurality of lights 260 may be light emitting diodes (LEDs). The plurality of lights 260 may be electrically coupled to a trailer electrical system via the wiring 256. The wiring 256 may be routed from the light housing 252 into the hollow center of the guidepost 200 and down through the guidepost 200. The wiring 256 may exit the bottom of the guidepost 200 via the bottom aperture 212 of the guidepost 200 and may then be routed through the frame of the boat trailer 900 to an electrical connector. Alternatively, the wiring 256 may be spliced into an existing trailer wiring harness that is coupled to other trailing lighting.

As a non-limiting example, the light mount 262 may comprise a clamp 264 coupled to a flat bar 266. The clamp 264 may couple to the attachment post 230 of the guidepost 200 using mounting hardware. The flat bar 266 may be coupled to the rear side of the light housing 252 of the light assembly 250. In a preferred embodiment, a left guide post mount 912 may be oriented to be perpendicular to the guidepost 200. The invention 100 may be coupled to the boat trailer 900 such that the light housing 252 is located on the inside of the guidepost 200 or the outside of the guidepost 200.

The pair of lighted guideposts may be coupled to opposing sides of the rear of the boat trailer 900 such that the light assemblies 250 may designate the rear of the boat trailer 900. As a non-limiting example, a first lighted guidepost 282 may be coupled to the left guide post mount 912 and a second lighted guidepost 284 may be coupled to a right guide post mount 914. It shall be further noted that the light assemblies 250 are able to rotate 90 degrees from an outward orientation to an inward orientation, and vice versa as needed (see FIG. 4).

In a preferred embodiment, the support leg 210, the stopper coupling 220, the attachment post 230, and the cap 240 may be 2 inch PVC pipe and fittings. The height of the guidepost 200 from the bottom aperture 212 to the top of the cap 240 may be 5.0 feet +/−1.0 feet. The flat bar 266 may be made from 5 inch by 1 inch aluminum rectangular bar.

In use, a pair of lighted guideposts may be coupled to the guide post mounts on the boat trailer 900 such that the first lighted guidepost 282 extends upwards from the rear left side of the boat trailer 900 and the second lighted guidepost 284 extends upwards from the rear right side of the boat trailer 900. The wiring 256 emerging from the bottom of the first lighted guidepost 282 and the first lighted guidepost 282 may be electrically coupled to the trailer electrical system such that the plurality of lights 260 located at the top of the first lighted guidepost 282 and the top of the second lighted guidepost 284 may be illuminated when energized by the tow vehicle.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

As used in this disclosure, the "centerline" may be an imaginary line that defines the center of one or more cross sections of an object. Unless stated otherwise, the centerline follows a longitudinal path through the object at the center of lateral cross sections. If the object is tubular, the centerline follows the center of the tube.

As used herein, the words "couple", "couples", "coupled" or "coupling", may refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, "guide post" (also referred to as a "guidepost", "guide on post" or "boat trailer guide post") may refer to a vertically-oriented post coupled to the rear of a boat trailer such that the guide post shows above the surface of the water when the rear end of the trailer is submerged while launching and loading a boat. Guide posts are typically deployed in pairs with one guide post coupled to each side of the trailer.

As used in this disclosure, a "housing" may be a rigid or semi-rigid casing that encloses and protects one or more devices.

As used in this disclosure, the word "lateral" may refer to the sides of an object or movement towards a side. Lateral directions are generally perpendicular to longitudinal directions. "Laterally" may refer to movement in a lateral direction.

As used in this disclosure, a "lens" may be a transparent substance through which light can pass. A lens may or may not be formed with curved surfaces that are used to concentrate or disperse the light that travels through the lens.

As used herein, "mounting hardware" may refer to mechanical devices that are used to attach one object to another, including devices whose only purpose is to improve aesthetics. As non-limiting examples, mounting hardware may comprise screws, nuts, bolts, washers, rivets, crossbars, hooks, collars, nipples, cams, standoffs, knobs, caps, plates, rails, lips, brackets, or any combination thereof.

As used herein, "non-opaque" may refer to the optical properties of an object which does not block the passage of light. As non-limiting examples, the non-opaque object may be either transparent or translucent.

As used herein, "oblique angle" may refer to any angle that is not a right angle or a multiple of a right angle.

As used herein, "outside diameter" or "outer diameter" may refer to a measurement made on an object. Specifically, the outside diameter is the distance from one point on the outside of the object to a point on the opposite side of the object along a line passing through the center of the object.

As used in this disclosure, a "trailer" may be an unpowered wheeled vehicle that is towed by a powered vehicle such as a tractor.

As used in this disclosure, "vertical" may refer to a direction that is parallel to the local force of gravity. Unless specifically noted in this disclosure, the vertical direction is always perpendicular to horizontal.

As used herein, "weatherproof" may refer to an object's ability to withstand exposure to weather without damage or loss of function. Weather may comprise wind, rain, snow, ice, sun exposure, or any combination thereof.

Throughout this document references to "wire", "wires", "wired", or "wiring" may describe and/or show a single conductor when, in fact, two conductors may be required to power or control a subsystem; a convention used herein is that the common return conductor to which all electrical subsystems are connected may not be shown in order to clarify the figures. This common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A lighted guidepost for a boat trailer comprising:
a guidepost and a light assembly;
wherein the guidepost is coupled to a boat trailer such that the guidepost extends vertically above a side of the rear of the boat trailer;
wherein the guidepost is configured to be visible even when the rear of the boat trailer is submerged in water;
wherein the light assembly is coupled to the top of the guidepost;
wherein the guidepost comprises a support leg, a stopper coupling, an attachment post, and a cap;
wherein the bottom half of the support leg comprises a pin aperture that passes laterally through the support leg;
wherein the pin aperture is configured to retain the guidepost on a guidepost mount of the boat trailer;
wherein the guidepost is retained on the guidepost mount by a push pin that passes through the pin aperture of the support leg and through a matching aperture on the guidepost mount;
wherein the light assembly comprises a light housing, a lens, a plurality of lights, and the light mount;
wherein the light assembly is coupled to the attachment post of the guidepost via the light mount such that the light assembly is elevated above the boat trailer;
wherein the light assembly is illuminated to increase visibility of the guidepost.

2. The lighted guidepost for a boat trailer according to claim 1
wherein the guidepost comprises a linear coupling of the support leg, the stopper coupling, the attachment post, and the cap in that order;
wherein the guidepost is upright when installed on the boat trailer;
wherein the light assemblies are able to rotate 90 degrees from an outward orientation to an inward orientation, and vice versa.

3. The lighted guidepost for a boat trailer according to claim 2
wherein the support leg is a hollow cylindrical tube;
wherein the top of the support leg is coupled to the stopper coupling;
wherein the bottom of the support leg comprises a bottom aperture through which wiring emerges from the guidepost.

4. The lighted guidepost for a boat trailer according to claim 3
wherein the support leg comprises at least ¾ of the height of the guidepost.

5. The lighted guidepost for a boat trailer according to claim 3
wherein the stopper coupling is a hollow cylindrical tube comprising a larger outside diameter than the support leg;

wherein the stopper coupling couples the support leg to the attachment post;

wherein the stopper coupling also stops the light assembly from sliding down the guidepost in the event that a light mount loosens.

6. The lighted guidepost for a boat trailer according to claim 5 wherein the attachment post is a hollow cylindrical tube comprising the same outside diameter as the support leg;

wherein the light assembly couples to the attachment post to elevate the light assembly.

7. The lighted guidepost for a boat trailer according to claim 6 wherein the cap couples to the top of the attachment post and covers the top of the guidepost.

8. The lighted guidepost for a boat trailer according to claim 7 wherein the light housing is an enclosure for the plurality of lights;

wherein the lens covers the front of the light housing.

9. The lighted guidepost for a boat trailer according to claim 8 wherein the light housing and the lens form a weatherproof covering for the plurality of lights.

10. The lighted guidepost for a boat trailer according to claim 9 wherein the lens is a non-opaque covering such that light from the plurality of lights is visible outside of the light housing.

11. The lighted guidepost for a boat trailer according to claim 10 wherein the plurality of lights are a plurality of electrical devices that generate visible light when energized.

12. The lighted guidepost for a boat trailer according to claim 11 wherein the plurality of lights are light emitting diodes.

13. The lighted guidepost for a boat trailer according to claim 11 wherein the plurality of lights are electrically coupled to a trailer electrical system via the wiring;

wherein the wiring is routed from the light housing into the hollow center of the guidepost and down through the guidepost.

14. The lighted guidepost for a boat trailer according to claim 13 wherein the light mount comprises a clamp coupled to a flat bar;

wherein the clamp couples to the attachment post of the guidepost using mounting hardware;

wherein the flat bar is coupled to the rear side of the light housing of the light assembly.

15. The lighted guidepost for a boat trailer according to claim 14 wherein a left guide post mount is oriented to be perpendicular to the guidepost.

16. The lighted guidepost for a boat trailer according to claim 15 wherein a pair of lighted guideposts is coupled to opposing sides of the rear of the boat trailer such that the light assemblies designates the rear of the boat trailer.

* * * * *